April 8, 1969     H. D. FARNSWORTH     3,437,243
MEANS FOR GAUGING TIMED DOSAGES FROM A DISPENSING CONTAINER
Filed June 22, 1967
*Figure 1*
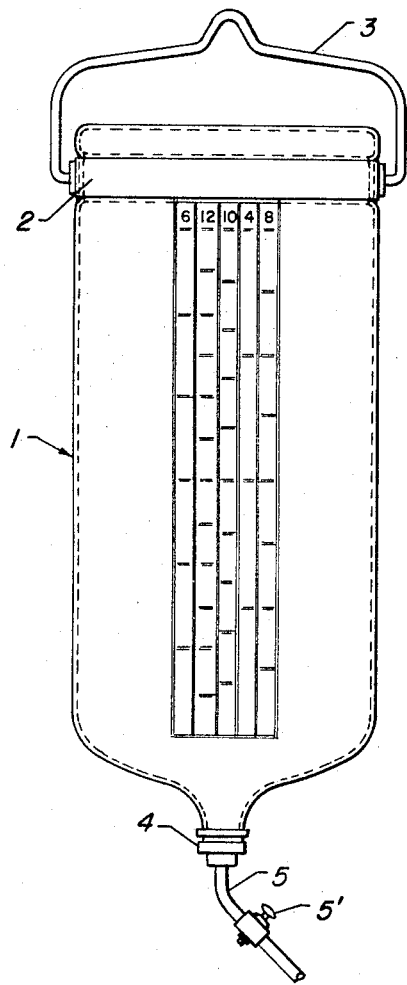
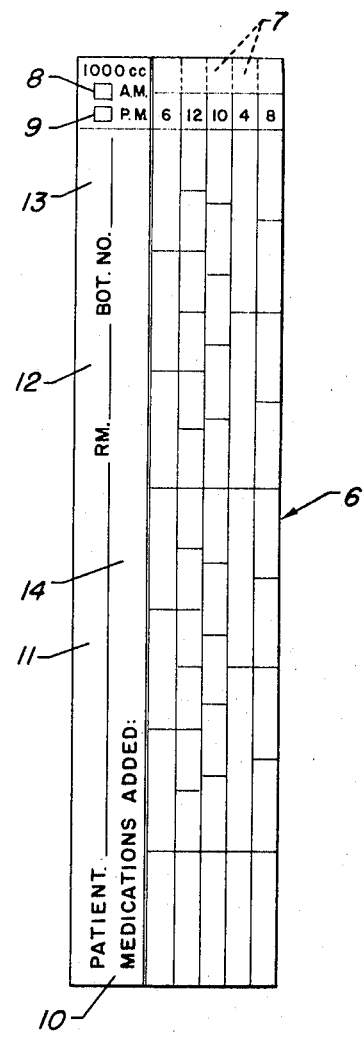
*Figure 2*
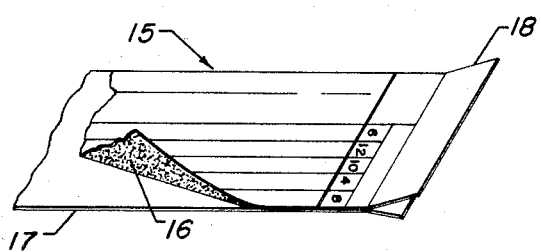
*Figure 3*
INVENTOR:
Helen D. Farnsworth
BY:
*Philip J. Liggett*
ATTORNEY 
United States Patent Office 3,437,243
Patented Apr. 8, 1969

3,437,243
MEANS FOR GAUGING TIMED DOSAGES FROM A DISPENSING CONTAINER
Helen D. Farnsworth, 12 Hatlen Ave., Mount Prospect, Ill. 60056
Filed June 22, 1967, Ser. No. 648,038
Int. Cl. B67d 5/38; G01f 23/02, 23/00
U.S. Cl. 222—154                                  9 Claims

ABSTRACT OF THE DISCLOSURE

A dispensing container for fluids having gauge markings positioned thereon along its side portion so that there may be readily timed and controlled gauging of fluid flow from the container. One or more columns of gauge markings may be used and each column of markings shall have a predetermined number of transverse subdivisions spaced apart in proportioned relation to the container size and at the same time proportioned to a predetermined time interval, whereby fluid flow from the container can be visually noted and aid in easily maintaining a desired controlled rate of discharge.

Specification

This invention relates to means for obtaining timed gauging of the dispensing of fluid from a container. More specifically, the invention is directed to the use of special gauge markings in combination with a dispensing container such that there may be visual observation of the fluid flow and easy maintenance of a controlled rate of discharge from the container.

Background of the invention

At the present time most all dispensing containers or bottles for chemical compounds, medicines, intravenous fluids, etc., have volumetric markings, if any, along the side of the container. Such markings may be of advantage in the pouring out of a particular quantity or proportion of the total quantity of fluid; however, such markings are of no use or value whatever, when it is necessary to effect the gradual dispensing of the fluid into a processing system or administering it into a human being. For example, the improved gauge markings are of advantage in the administration of intravenous fluids into a patient. Where the parenteral fluid is being dispensed from the usual 1000 cc. or 500 cc. bottle or container which has volumetric graduations, a nurse has to guess or estimate whether or not the fluid is being released at a rate specified by the physician. It is quite common at the present time to have antibiotic medications added to glucose or other intravenous fluids and thus be slowly injected into the patient along with the feeding solution. However, where the injection is lagging behind a prescribed rate, there is danger that the medicine will be ineffective and, on the other hand, where the feed rate is too fast, there can be irritation to the vein being used, and the danger of an air embolus occurring if the infusion runs out before a new one is added. With dispensing of fluids from the improved container, which is marked with relation to time, then a nurse, nurse's aid, the patient, or any one, can quite easily visually observe as to whether or not that fluid is going out in accordance with the prescribed rate.

Summary of the invention

It may be considered a principal object of the present invention to have dispensing container means which has gauge markings along the length thereof that are designed and spaced to directly correlate the container size for at least one predetermined time period, whereby there may be the visual observation of the rate of discharge and an easy noting as to whether the discharge rate is maintaining a prescribed schedule.

A further object of the invention is to provide multiple rows of gauge markings, with each of the different rows of markings being designed with spaced markings which will correlate a particular container size to different predetermined time intervals.

A still further object of the invention is to provide gauge markings on attachable strip means whereby the strip may be applied to an unmarked container of a predetermined size such that there may be the timed dispensing of a fluid from the container and a visual observation of the rate of discharge of liquid from the container.

In a broad aspect, the present invention provides an arrangement for gauging timed dosages from a container means such that there is thereby provided, in combination with the dispensing container, one or more columns of gauge markings along the side of such container, with each column being for a predetermined time period and being subdivided into a number of transverse gauge markings spaced apart in proportion to the container size and at the same time spaced at distances to correspond with such predetermined time interval, whereby the flow of fluid from the container can be visually noted with respect to such transverse markings and readily determine whether the fluid flow is maintaining a desired control rate of discharge.

The dispensing container may have the one or more columns of transverse gauge markings embossed onto, or impressed into the surface of the container, as for example being cast into the wall portion of the container while it is being made. Molded or cast glass or other similarly formed materials may readily obtain gauge markings during the manufacturing operation. On the other hand, the gauge markings may be printed or silk screened onto the surface of the container in any conventional manner and it is not intended to limit the present invention to any one means or method of applying the one or more columns of transverse gauge markings.

Actually, where desired, the gauge markings may be merely temporarily applied to the dispensing container by the utilization of an attachable strip means. The strip means may comprise preprinted gauge markings on a strip of paper, card board, plastic, or other printable material, which in turn may be attached to the side wall of the container. In another instance, the attachable strip means may comprise printed cardboard, or paper-like strips, each of which has a gum-like adhesive backing material such that the strip may be readily placed onto the side of the container and be self-holding. Where it is of advantage to keep a record of a particular dosage, feeding or medical treatment, which has been dispensed from the container, then the attachable strip means will preferably use an adhesive which will also permit the easy removal of the strip such that it may be subsequently placed in a particular file or entered into a system of records. For instance, in the dispensing of parenteral fluids in hospitals, it is of advantage to be able to maintain the record of the parenteral fluid and simultaneous medication given a patient and then carry along this record to the chart room or other place where more permanent records are kept for each hospital patient.

The use of multiple rows of gauge markings on any one container or on an attachable strip will permit the selection of the correct column of transverse markings to suit a predetermined time interval. For example, typical or standard periods of administering dosages, which may vary from 4 to 12 hours, can be predetermined and correlated with standard sized containers. Only one column of gauge markings may be utilized at any one time. Thus, where it is desired to effect a dosage over a six hour period then the column divided for six, or fractions of six, will be used. In another instance, it may be desired to introduce the same quantity of fluid over a time interval of 10 hours, in which the case the column divided into ten spaces will be used. Where there is a choice of columns available on the container then the particular column to be utilized will be marked with an hourly projection by the nurse when the doctors order is transferred to the gauge for watching by the attendant to insure the obtainment of the dosage over the prescribed time interval. Of course, as noted for any one dosage, there will merely be the utilization of the one column of gauge markings at any one time.

Reference to the accompanying drawing and the following description thereof will serve to more clearly describe the advantages of the improved gauge markings with a relation to time in combination with a dispensing container.

*Description of the drawing*

FIGURE 1 of the drawing indicates diagrammatically, in an elevational view, a typical medication form of dispensing bottle with different columns of transverse gauge markings, where each column is for a different predetermined time interval correlated with respect to the size of the container.

FIGURE 2 of the drawing shows in a somewhat larger elevational view, one design or embodiment of a multiple column gauge system for the side wall of a dispensing container and open space provisions for the insertion of useful and additional information with respect to the given time dosage for a particular treatment.

FIGURE 3 of the drawing merely indicates diagrammatically one means for having an adhesively backed gauge strip which permits the ready attachment of a preprinted or marked strip means for use in combination with a dispensing container whereby there may be the timed dispensation of fluid from an unmarked container.

Referring now particularly to FIGURE 1 of the drawing there is shown a container or bottle 1 which may be of a typical form of dispensing bottle as utilized in hospitals with a clamp ring 2 and bail or hanger means 3 opposite the fluid outlet end 4. Tubing or hose means 5 will carry the fluid to its desired destination, while suitable valving 5', or other control means will be downstream from the dispensing end 4.

In this instance, five different columns with the numeral headings provide transverse gauge markings, as indicated on the side of the container 1, with each column being for a different time period. For convenience of description, the columns have been marked with spacings and numbers to correspond with, respectively, 6 hour, 12 hour, 10 hour, 4 hour and 8 hour time periods. Thus, each of the columns is divided into the respective number of spaces or intervals to correspond with its heading, whereby there may be visual observation of the rate of discharge over a predetermined time interval and the noting as to whether or not such rate of discharge is in accordance with that desired. For example, where the particular quantity of fluid held in the container 1 is to be dispensed over a six hour period, then the nurse will note, actually mark down, the time of starting the dosage and each succeeding hour to completion so that an attendant can readily observe after one hour whether or not the liquid level in the bottle has fallen so as to be substantially in line with the first transverse marking in the column under the heading 6. In a similar manner, say four hours after starting a dosage, the attendant can note whether or not the liquid level has reached the fourth lower transverse marking in the column heading 4, or has gone beyond the marking and, in turn, note whether or not the rate of dispensing is proper.

As set forth briefly hereinbefore, and particularly with medications in intravenous feedings, it is necessary that the feeding follow a fairly accurate rate of dispensation. There are, however, various problems which can upset a normal flow, for instance with plastic needles on the ends of the tubes for intravenous feedings there is sometimes a speeding-up of the dosage by virtue of the patient moving or, conversely, a slowing down of the feeding where the needle may rest against a vein wall. In a 1,000 cc. container, it is not uncommon that an intravenous feeding will be found to carry over as much as two hours behind schedule where there is an improper setting of the drop rate by the valving or a blocking of the needle by the vein wall.

As another example of use of the improved container, where the fluid dosage rate is to follow a ten hour schedule and be completed in such time period, then the attendant will be merely observing the transverse markings which in turn will normally have hourly projections noted by the nurse, in the column head 10 and ignore any of the other columns. The attendant will, in turn, periodically observe the rate of discharge of the fluid after initially noting the time of the beginning of the feeding. He may observe hourly, half-hourly, or at any time period, and readily tell as to whether the fluid has reached the right level or transverse marking in reationship to time elapsed. Actually, with the transverse gauge markings on a hourly basis the attendant can judge fractions of hours between any one marking fairly accurately. On the other hand, where desired, each column of hourly markings may in turn be subdivided on a container, or on a separate strip, with partial transverse markings which would denote fractional portions of an hour; however, in most cases, this type of marking would be deemed unnecessary.

Referring now to FIGURE 2 of the drawing there is indicated a group of gauge markings which may be on a separate attachable strip means 6, or may comprise merely an embossed or printed arrangement directly on a dispensing container. In this embodiment, there are again indicated five columns of transverse markings with the headings 6, 12, 10, 4 and 8 in order to correspond with generally used time intervals for a particular container which is to have its fluid contents dispensed. It should, however, be noted that it is not intended to limit the present invention to any predetermined hourly rates or any predetermined sets of markings inasmuch as the rates may be entirely different. For example, the markings may be correlated for rates to be in terms of minutes or, alternatively, in terms of a large number of hours of the order of 20 hours or more. In any case, each of the particular columns of gauge markings will have a uniform division of the length of the total column so as to be able to gauge the rate of discharge for the particuar time period to be involved. Thus, the column headed 12 will have twelve transverse spaces to correspond which a 12 hour rate of discharge. Similarly, the column headed 8 will have transverse markings to provide 8 spaces so that an 8 hour time period can be observed and monitored for a proper rate of discharge. In the design of the markings of FIGURE 2, there is provided a space 7 above the plurality of columns of time intervals, and such space may be conveniently used to be marked by pencil, or other suitable marking medium, for the time at which the fluid dispensing is initiated. For example, where the dosage is started at 10:00 a.m. then the numeral 10 may be written into the space 7 while a cross or check mark is placed in the block 8 in front of the lettering AM. In a similar manner any other starting hour for the beginning time period may be noted within the box 7 and the proper a.m. or p.m. situation marked within one of the spaces 8 or 9.

Inasmuch as each group of transverse markings must be correlated to a particular container size then the printing or labeling of a particular group of markings will have spaces to suit each of the different standard sized containers. Thus, in order to insure that a user of a particular set or group of markings on an attachable label will have the proper label for a particular size bottle, then the container size may be designated in combination with the group of gauge markings. By way of example, the embodiment of FIGURE 2 has a 1000 cc. designation above the boxes 8 and 9.

For convenience, a preferred form of detachable "time gauging strip" will have additional useful spaces, such as provided by the area 10, whereby there may be a written record of the particular use of the dosage involved. For instance, in hospital usage, there may be space for a patient's name along area 11, a space for a room number in area 12 and a space for a bottle number in area 13. At the same time, there may be a suitable space 14 to record information with respect to a particular form of medication, or combination of medications, which are being dispensed to a particular patient at a particular hour.

In FIGURE 3 of the drawing there is shown diagrammatically the utilization of a separate adhesively-backed, detachable form of strip means having desired gauge markings for correlation of container size with predetermined time intervals. The strip means may be of cardboard, plastic or other printable material 15, and will generally be of the form described wth FIGURE 2. However, in this embodiment the strip 15 will have adhesive means 16 on a side opposite the gauge markings. The adhesive 16 may be protected by suitable removable paper or other covering 17 so that there will not be any undesired adhering of a strip unit until such time as it is desired to place it on a particular container. In other words, where the attendant is to make use of a time relation dispensing of a fluid material from a container there will be a removal of the protective backing 17 from the adhesive surface 16 and the direct application of the gauged markings strip 16 on the side of a container which merely has volumetric markings, or no markings whatever. For convenience, there may be a suitable extra end portion 18 to the strip 15 so as to permit the tearing-off or initial removal of the backing 17 from the strip 16. It is not intended to limit the present invention to any one type of strip material or to any one type of adhesive material or means; however, where it is desired to have the manual placement and subsequent detachment from a glass or plastic bottle, or other dispensing container, then certain of the modern forms of non-drying, gum adhesives which do not take a permanent set or bond will be provided on the back of the strip.

On the other hand, where gauge markings need not be removed for record purposes, the gauge marking area or, strip means may comprise non-removable forms of material such as those with plastic type surfaces where there may be an initial printing of names or numbers, or both, onto the strip and then a subsequent easy erasure, washing or other removal step taken to effect the entire recleaning of the control marking zone. In other words, after a container has been utilized for one rate of dispensing or dosage with a particular process or to a particular person, then the time, name designations, and the like, may be removed and the entire strip and container made ready for reuse with a different patient or with a different process. Some of the gauge column periods must, of course, be usable for prescribed dosage period and correlate with the container size to be used.

From the foregoing description, it will be observed that the present improved gauge markings with relation to time will obviate the need for a nurse or laboratory attendant to convert volumetric marks into time periods (which many attendants are not capable of doing) and provide an easy visual observation of the rate of administration or dispensation of a particular form of fluid from the container.

In connection with antibiotics and other medications used in connection with intravenous feedings of patients there will be a more accurate administration of such medications within a specified period of time so as to avoid irritation to veins or, more importantly an air embolus. Also, by having time gauge markings in connection with the dispensing container one is able to readily note whether or not the rate of discharge is following the prescribed time interval. Still further, there will be the easier judgement of the proper time for the removal of a particular dosage from a patient. For instance in an intravenous feeding, where the infusion runs out too soon or before a new one is added, there can be danger of an air embolus existing to the patient as hereinbefore noted.

Again it should be pointed out that the improved time relation gauge markings for a dispensing container shall not be limited to any one time period or to any predetermined number of colums which may be imprinted or attached in combination with the container. There may be as many columns utilized on a container as may be convenient or to cover the scope or range of usage of the particular container. Columns of transverse markings as heretofore described and as shown on the accompanying drawing are merely by way of illustration and are not to be limiting in any way.

I claim as my invention:

1. In combination with a dispensing container for fluids, including means for adjusting the rate of fluid discharge therefrom, the improved control gauge means for effecting the ready timed dispensing of a particular fluid from the container, which comprises, the provision of a plurality of subdivided columns of gauge markings along the side of the container, each column being for a different predetermined time period and subdivided by a predetermined number of transverse gauge markings spaced apart in proportion to the particular container size and at the same time spaced at distances to correspond with fractions of such predetermined time period whereby the descending level of fluid in the container can be visually noted with respect to a selected column of transverse markings and one can readily determine whether the fluid flow is maintaining a desired controlled rate of discharge with relation to any one of a plurality of time periods for such particular container size.

2. The container of claim 1 further characterized in that said gauge markings are fixedly fabricated onto the surface of the fluid container.

3. The dispensing container of claim 1 further characterized in that the control gauge markings are formed within the wall of the container as a part of the manufacture of each container.

4. The dispensing container of claim 1 further characterized in that said control gauge markings are imprinted on the wall of the container after the fabrication thereof.

5. The dispensing container of claim 1 further characterized in that said columns of gauge markings are placed on a non-encompassing attachable strip means.

6. The dispensing container of claim 5 still further characterized in that said attachable strip means in turn is provided with attachable-detachable adhesive along at least an edge portion thereof whereby such strip means can be removed for record purposes after the container has been emptied of fluid.

7. The dispensing container of claim 5 further characterized in that the attachable strip means for such gauge markings has provision along the side thereof to provide additional marked notations, whereby there may be desired information for reocrd purposes contained on the same timed marking strip.

8. The dispensing container of claim 1 further characterized in that each column is provided with spaces for marking successive time periods therealong.

9. The dispensing container of claim 1 further characterized in that said fluid discharge adjusting means is a valve means.

(References on following page)

References Cited

UNITED STATES PATENTS

| | | | |
|---|---|---|---|
| 2,432,605 | 12/1947 | Barach | 116—118 X |
| 2,507,684 | 5/1950 | Smith | 215—7 X |
| 3,074,451 | 1/1963 | Whitney | 128—214 X |
| 3,207,298 | 9/1965 | Wilson | 128—227 X |

STANLEY H. TOLLBERG, *Primary Examiner.*

U.S. Cl. X.R.

116—118; 128—214